Nov. 26, 1935. W. LEUSCHNER 2,022,599
PISTON FOR HYDRAULIC BRAKES
Filed May 7, 1935
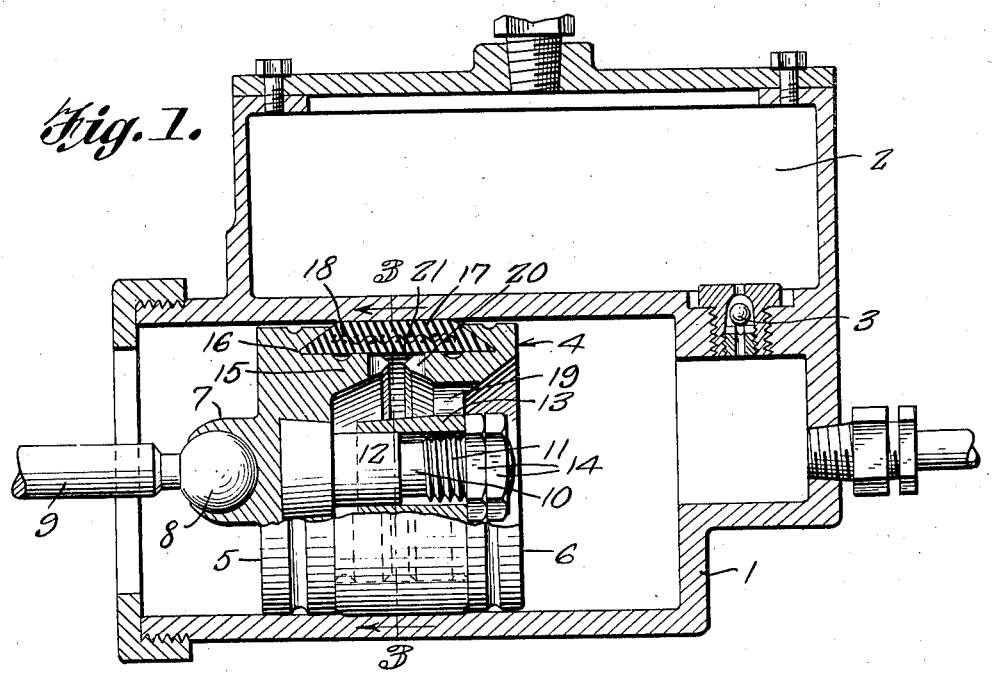
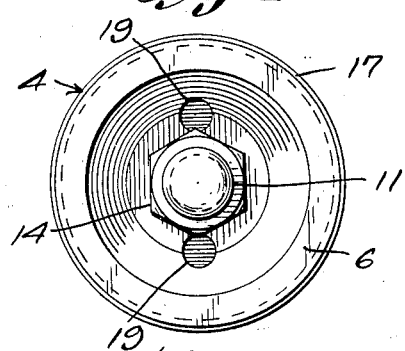
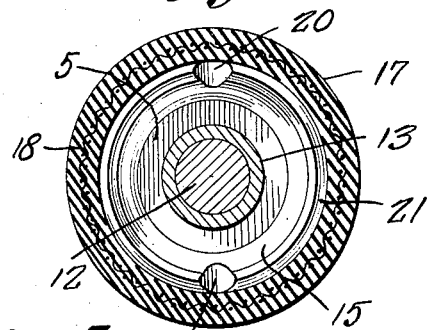
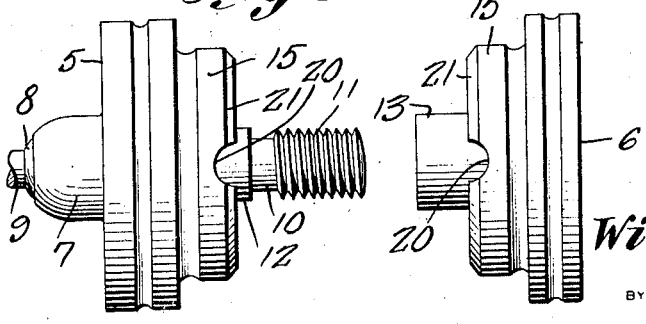
William Leuschner, INVENTOR
BY Victor J. Evans & Co.
ATTORNEY Patented Nov. 26, 1935

2,022,599

UNITED STATES PATENT OFFICE 2,022,599

PISTON FOR HYDRAULIC BRAKES

William Leuschner, Herkimer, N. Y.

Application May 7, 1935, Serial No. 20,286

1 Claim. (Cl. 309—31)

This invention relates to pistons for hydraulic brakes and more particularly to a master piston for the master cylinder of a hydraulic brake system, and has for the primary object the provision of a device of this character which will employ fluid pressure developed by its movement to prevent leakage between itself and the walls of the cylinder by providing an expansible packing contacting the walls of the cylinder and acted on by the fluid pressure.

With these and other objects in view, this invention consists in certain novel features of construction, combination and arrangement of parts to be hereinafter more fully described and claimed.

For a complete understanding of my invention, reference is to be had to the following description and accompanying drawing, in which Figure 1 is a vertical sectional view showing a piston constructed in accordance with my invention mounted in the master cylinder of a hydraulic brake system.

Figure 2 is an end view illustrating a piston.

Figure 3 is a transverse sectional view taken on the line 3—3 of Figure 1.

Figure 4 is a side elevation illustrating one of the piston heads of the piston.

Figure 5 is a side elevation illustrating a companion piston head to the piston head shown in Figure 4.

Referring in detail to the drawing, the numeral 1 indicates a master cylinder of a hydraulic brake system and has associated therewith a fluid supply reservoir 2, the latter being in communication with the master cylinder by a port controlled by a check valve 3. The foregoing described parts are shown for the purpose of illustrating the use of a master piston 4 forming the subject matter of the present invention.

The piston 4 consists of piston heads 5 and 6 of annular formation and are detachably and adjustably connected in opposed relation. A socket 7 is formed on the outer face of the piston head 5 and receives a ball 8 formed integrally with a connecting rod 9 whereby said connecting rod may have universal movement with respect to the piston. The connecting rod is connected to the conventional type of brake operating means (not shown). Formed on the opposite face of the piston head 5 from the socket 7 is a stem 10 having a reduced screw threaded portion 11 and a bearing portion 12 engaged by a sleeve 13 forming an integral part of the piston head 6. The screw threaded portion 11 extends through the sleeve 13 and the piston head 6 and has threaded thereon nuts 14, whereby the piston heads are adjustably and detachably connected.

Annular flanges 15 are formed on the opposing faces of the piston heads 5 and 6. The opposing faces of the piston heads 5 and 6 are provided with annular grooves 16 cooperating with the flanges 15 in forming seats for an expansible cylindrical packing 17 constructed of any material suitable for the purpose and strengthened by reinforcements 18. One wall of each groove 16 is beveled and the ends of the packing are beveled to conform to the beveled walls of the grooves. The packing contacts walls of the cylinder 1 between the piston heads and the piston head 6 is provided with ports 19 to admit fluid pressure from the cylinder 1 to the space or chamber defined between the piston heads and the packing so that the fluid pressure may act on the packing 17 to expand the latter against the walls of the cylinder and thereby establish a leak proof connection between the piston and the cylinder.

Notches 20 are provided in the edges of the flanges 15 and said edges are also beveled, as shown at 21, the bevels extending into the notches. As wear occurs to the packing the piston heads may be adjusted towards each other until the flanges 15 thereof abut. The bevels 21 and notches 20 with the flanges 15 in abutting engagement will still permit the fluid pressure to act on the packing to expand the latter. The notches communicate with the chamber between the piston heads and the bevels 21 permit circulation of the fluid pressure entirely about the interior circumference of the piston and thereby equalize the fluid pressure to the interior of the packing.

During the movement of the piston to actuate the fluid of the brake system to develop pressure, the fluid pressure will enter the chamber in the piston by way of the ports 19 and act to expand the packing against the walls of the master cylinder and thereby establish a tight sliding fit of the pistons with the cylinder and consequently prevent leakage past the pistons.

Having described the invention, I claim:

A piston for hydraulic brake systems comprising adjustably and detachably connected piston heads arranged in opposed relation and defining therebetween a chamber opening outwardly through one of the piston heads to receive fluid pressure, said piston head having annular grooves in the opposing faces thereof, annular flanges formed on the opposing faces of the piston heads and cooperating with the grooves in forming seats, a cylindrical packing supported by the seat and acted upon by the fluid pressure of the chamber to become expanded thereby, said flanges being notched at the edges thereof and said edges being beveled to cooperate with the notches in distributing fluid pressure to the packing when said flanges are brought in contact with one another by the adjustment of the piston heads to compensate for wear occurring to the packing.

WILLIAM LEUSCHNER.